Patented Aug. 21, 1951

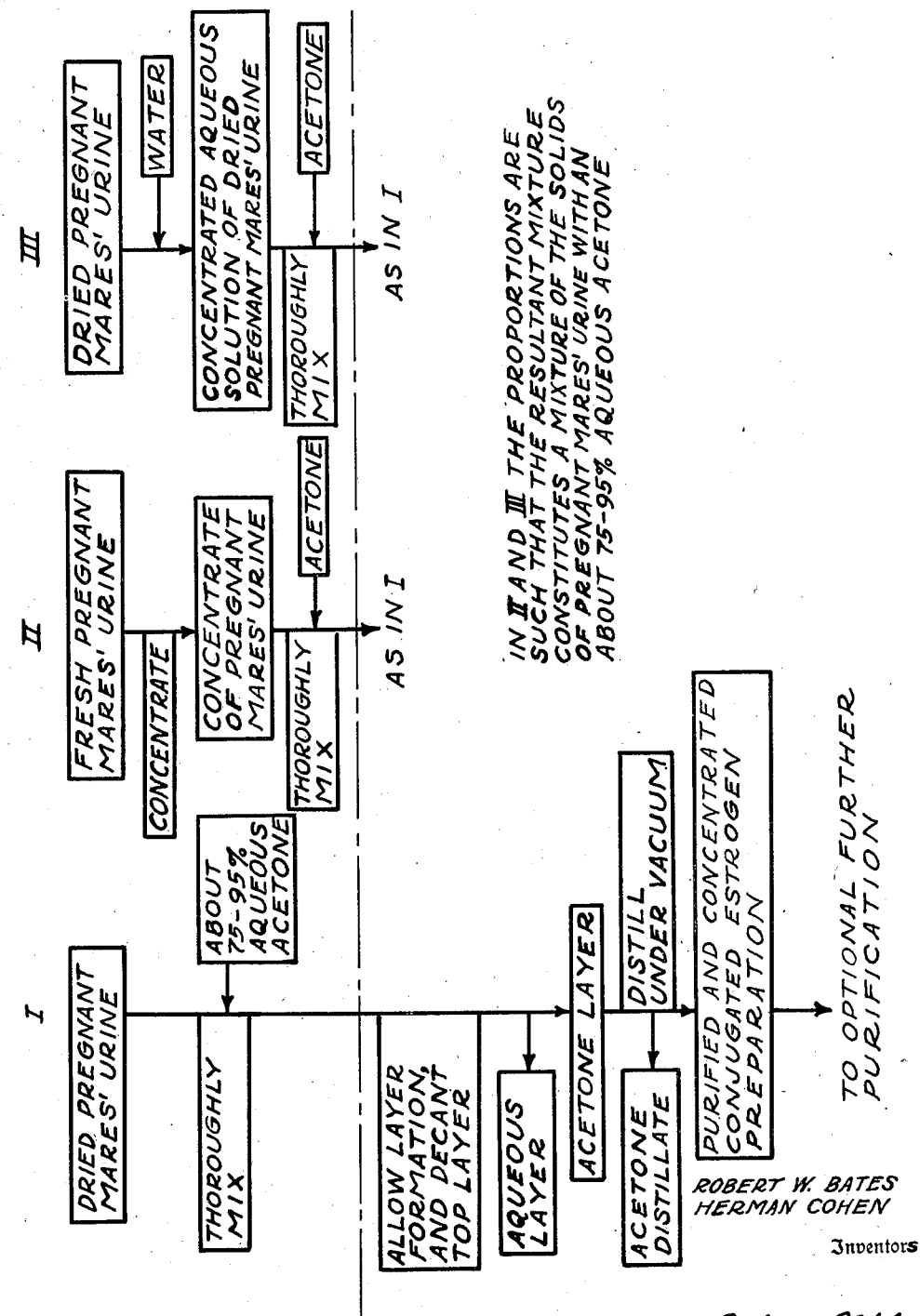

2,565,115

UNITED STATES PATENT OFFICE 2,565,115

METHOD OF OBTAINING A CONJUGATED ESTROGEN PREPARATION

Robert W. Bates, Bound Brook, and Herman Cohen, New Brunswick, N. J., assignors to E. R. Squibb & Sons, New York, N. Y., a corporation of New York Application October 28, 1948, Serial No. 57,118

3 Claims. (Cl. 167—74.5)

This invention relates to estrogen preparations.

Estrogen preparations are used in a considerable variety of conditions associated with a deficiency of estrogens (including treatment of the symptoms of the menopause syndrome, natural or artificial, senile vaginitis, kraurosis vulvae, pruritis vulvae, and hypogenitalism). Preparations are available of crystalline natural estrogens (estriol and estrone), of synthetic substances having estrogenic activity (e. g., diethylstilbestrol), and of non-crystalline, concentrated and purified natural estrogenic substances (both in water-insoluble and water-soluble form, the estrogens in the water-soluble form being known, and referred to herein, as "conjugated estrogens").

A typical conjugated-estrogen preparation contains sodium estrone sulfate as the principal estrogen, a (variable) small amount of other equine estrogens, and a relatively large quantity of non-estrogenic material, and is obtained from pregnant-mares' urine by the following general method: adding xylene (to prevent hydrolysis), and concentrating the urine; extracting the concentrate with butanol; washing the butanol extract with aqueous sodium hydroxide and then with water; concentrating the washed extract to small volume; taking up the concentrate in acetone, and removing insoluble material; concentrating the acetone solution; treating the concentrate with an excess of ether; and recovering and drying the resulting precipitate. The conjugated-estrogen preparation thus obtained is then tabletted or dissolved in aqueous alcohol for oral administration. This general method, however, is inefficient and otherwise unsatisfactory; for example, considerable difficulty is encountered with the formation of an emulsion in the butanol extraction. Another method of obtaining a conjugated-estrogen preparation involves selective (charcoal) adsorption from the urine, elution, purification of the eluate by solvent partition, and vacuum-drying, but such method is not wholly satisfactory.

It is the object of this invention to provide an improved method of obtaining conjugated-estrogen preparations from pregnant-mares' urine.

The method of this invention essentially comprises intimately contacting the solids of pregnant-mares' urine with aqueous acetone, separating the acetone phase from the aqueous phase, and recovering the solids in the acetone phase. Preferably, the aqueous acetone is an about 75–95% acetone (meaning, of course, that about 75–95% of the mixture is acetone), especially an about 80–90% acetone.

The intimate contact of the urine solids with the aqueous acetone may be effected by thoroughly mixing a concentrate of pregnant-mares' urine with acetone, by thoroughly mixing dried (especially spray-dried) pregnant-mares' urine with aqueous acetone, or by first preparing a concentrated aqueous solution of the dried urine and thoroughly mixing such solution with acetone.

The separation of the acetone phase from the aqueous phase may be effected simply by allowing these phases to settle into layers, and separating the acetone layer by decantation, no filtration being required or emulsion-difficulty being encountered. The separation of estrogenic activity from estrogenically-inert urine compounds and colored impurities by this acetone treatment is highly selective; thus, by the acetone treatment alone (repeated extractions), a preparation may be obtained containing almost all of the activity and only about 15% of the solids of the pregnant-mares' urine.

Preferably, the urine should be obtained from mares pregnant at least five months. A urine concentrate suitable for use in the practice of this invention may be obtained by adding to the fresh urine sufficient xylene to prevent hydrolysis of the conjugated estrogens, and then concentrating under reduced pressure at 40–50° C., while maintaining the pH at or near neutrality.

The solids recovered from the acetone phase (e. g., by distillation under reduced pressure) constitute a purified and concentrated conjugated-estrogen preparation. Preferably, such preparation is further purified and concentrated by extracting an aqueous solution thereof with ethyl ether (preferably after adjustment of the pH to about 2–4), to remove organic acids and non-conjugated steroids; desirably, the aqueous solution is then extracted with n-butanol (inorganic and other water-soluble impurities remaining in the aqueous phase), and the n-butanol removed from the latter extract (e. g., by evaporation under reduced pressure). A further (marked) increase in potency of the conjugated-estrogen preparation may be effected by washing this n-butanol extract with an about normal sodium hydroxide solution, and removing the n-butanol from the washed extract.

The conjugated-estrogen preparations obtained by the method of this invention may be therapeutically used per se (e. g., in tablet or aqueous-alcohol-solution form) or converted into a water-insoluble (non-conjugated) estrogen preparation and therapeutically used in that form. Such conversion may be effected by conventional acid hydrolysis (e. g., acidifying an aqueous solution of the conjugated-estrogen preparation to pH 1.5 with hydrochloric acid, boiling for three hours, extracting the hydrolyzed solution with ethylene dichloride, and evaporating the extract to dryness). Advantageously, the conversion is effected by enzyme hydrolysis.

Inasmuch as estrone sulfate is readily hydrolyzed, temperatures above 100° C. should be avoided in the method of this invention; and preferably the temperatures should be below 50° C.

The following examples are illustrative of the invention (the potency unit referred to herein being the equivalent of an International Unit of estrone as determined by fluorimetric measurement):

Example 1

One kilogram spray-dried pregnant-mares' urine is thoroughly mixed with two liters of 80% aqueous acetone, and the phases allowed to form separate layers. The top layer, a clear acetone extract, is decanted from the dark, viscous, aqueous lower layer. A second and third acetone extract is obtained by agitating this aqueous lower layer with one-liter portions of anhydrous acetone, and a fourth extract with one liter of 80% aqueous acetone, each of the additional extracts being decanted from the lower layer formed of the aqueous phase. The (combined) acetone extract is clarified by filtration through paper (this step not being essential, inasmuch as very little solid material is removed thereby); and the acetone is distilled off under vacuum at a temperature not exceeding 50° C. The residue is dissolved in one liter water; and the aqueous solution is acidified to pH 2.5 with hydrochloric acid, and extracted twice with 500 ml. portions ethyl ether. Sodium hydroxide (tenth-normal solution) is immediately added to the aqueous solution to pH 9.2; the solution is extracted five times with 250 ml. portions of n-butanol; and the (combined) butanol extract is evaporated to dryness in vacuo.

The product, obtained in a yield of about 37 g., contains about 90% of the conjugated-estrogens present in the spray-dried urine. Its sulfate content of approximately 30% indicates that almost all of the material is ethereal or phenolic sulfates of organic compounds. It may be tabletted or dissolved in an aqueous alcoholic vehicle in the same manner as the conjugated-estrogen preparations obtained by the prior methods.

Example 2

Two kilograms spray-dried pregnant-mares' urine is thoroughly mixed with 3 liters of 80% aqueous acetone, and the phases allowed to form separate layers. The top layer, a clear acetone extract, is decanted from the lower layer, a viscous aqueous material; and the latter is extracted twice with 1.5-liter portions anhydrous acetone, then thinned out with 300 ml. water, and again extracted with 1.2 liters anhydrous acetone, each of the additional extracts being separated by decantation from the viscous lower layer formed of the aqueous phase. The (combined) acetone extract is clarified by filtration, and the acetone distilled off under vacuum at a temperature not exceeding 50° C. The residue is dissolved in one liter water; and the aqueous solution, whose pH is about 8.3, is extracted with an equal volume of ethyl ether, and the ether phase discarded. The aqueous phase is adjusted to pH 4 with hydrochloric acid, again extracted with an equal volume of ether, and the ether phase discarded; and the aqueous phase is further acidified to pH 2 with hydrochloric acid, and extracted with an equal volume of ethyl ether. The aqueous phase is then adjusted to pH 8 with tenth-normal sodium hydroxide solution, and extracted with three 200 ml. portions of butanol; and the (combined) butanol extract is evaporated to dryness in vacuo, yielding about 60 g. of a conjugated-estrogen preparation substantially identical with that obtained in Example 1.

Example 3

Fresh pregnant-mares' urine is concentrated to 1/5–1/10 of its original volume (preferably until its specific gravity is about 1.25); and this concentrate is substituted for the spray-dried urine in the foregoing examples (using anhydrous acetone for the first extraction). The conjugated-estrogen preparation thus obtained is substantially identical with that obtained in the foregoing examples.

Example 4

One kilogram spray-dried pregnant-mares' urine, having a potency of 10 units/mg., is thoroughly mixed with 400 ml. water, and then 1.6 liters anhydrous acetone is added with stirring. After the mixture has stood for ten minutes, the acetone-extract layer is decanted from the dark, thick, aqueous lower layer. Second and third extracts (of the aqueous lower layer) are made with one liter anhydrous acetone each; 200 ml. water is added to the aqueous lower layer; and the aqueous lower layer is extracted with 800 ml. anhydrous acetone. The (combined) acetone extract is treated with a filter aid (e. g., Hyflo) and filtered; and the acetone is distilled off under vacuum at about 35° C. A conjugated-estrogen preparation is thus obtained in a yield of about 150 g., having a potency of about 70 units/mg., and containing almost all of the activity but only about 15% of the solids of the spray-dried urine.

The residue is dissolved in 500 ml. water, and acidified with hydrochloric acid to pH 2; and the solution is rapidly extracted with two portions of ether, each of equal volume to the solution. The aqueous phase is immediately adjusted to pH 8.5 with tenth-normal sodium hydroxide solution. It contains about 85 g. conjugated-estrogen preparation having a potency of about 95 units/mg.

The aqueous phase (having a volume of about 1,000 ml.) is extracted with five 250-ml. portions butanol; the (combined) butanol extract is distilled under vacuum at below 50° C.; and the residue is dissolved in water and freeze-dried. The product, a purified, therapeutically-utilizable conjugated-estrogen preparation, is obtained in a yield of about 37 g. (dry weight), and has a potency of about 170 units/mg.; and analysis thereof shows 4.38% ash, 0.68% nitrogen, and 28.8% sulfate.

Example 5

One kilogram spray-dried pregnant-mares' urine is thoroughly mixed with one liter of 80% aqueous acetone, and the phases allowed to form separate layers. The top (acetone extract) layer is separated by decantation; and the lower aqueous layer is extracted with three one-liter portions of anhydrous acetone. The (combined) acetone extract is evaporated to dryness; and the dry residue is dissolved in water, adjusted to pH 3 with hydrochloric acid, and extracted repeatedly with ether until the ether wash is colorless. The ether-washed aqueous solution is then extracted with four 250 ml. portions n-butanol; and the (combined) butanol extract, containing the conjugated estrogens, is then washed with three 150 ml. portions normal sodium hydroxide solution, followed by two washes with 150 ml. portions ether. The thus washed n-butanol solution of the conjugated estrogens is then concentrated to near dryness, 25 ml. water added and the solution is freeze-dried. 5.5 g. of a conjugated-estrogen preparation is thus obtained in the form of a light colored powder, having a potency of about 735 units/mg.

The invention may be variously otherwise embodied within the scope of the appended claims.

We claim:

1. The method of obtaining a conjugated-estrogen preparation, which comprises thoroughly mixing the components of a pair of the group consisting of (I) dried pregnant-mares' urine and aqueous acetone, (II) a concentrate of pregnant-mares' urine and acetone, and (III) a concentrated aqueous solution of dried pregnant-mares' urine and acetone, the proportions being such that the resultant mixture constitutes a mixture of the solids of pregnant-mares' urine with an about 75-95% aqueous acetone, separating the acetone phase from the aqueous phase, and recovering the solids in the acetone phase.

2. The method defined by claim 1, in which the proportions are such that the resultant mixture constitutes a mixture of the solids of pregnant-mares' urine with an about 80-90% aqueous acetone.

3. The method defined by claim 1, in which the acetone and aqueous phases are allowed to settle into layers, and the acetone layer is separated by decantation.

ROBERT W. BATES.
HERMAN COHEN.

REFERENCES CITED

The following references are of record in the file of this patent:

New and Nonofficial Remedies, 1947, page 346. (Copy in Division 43.)